Figure 1:
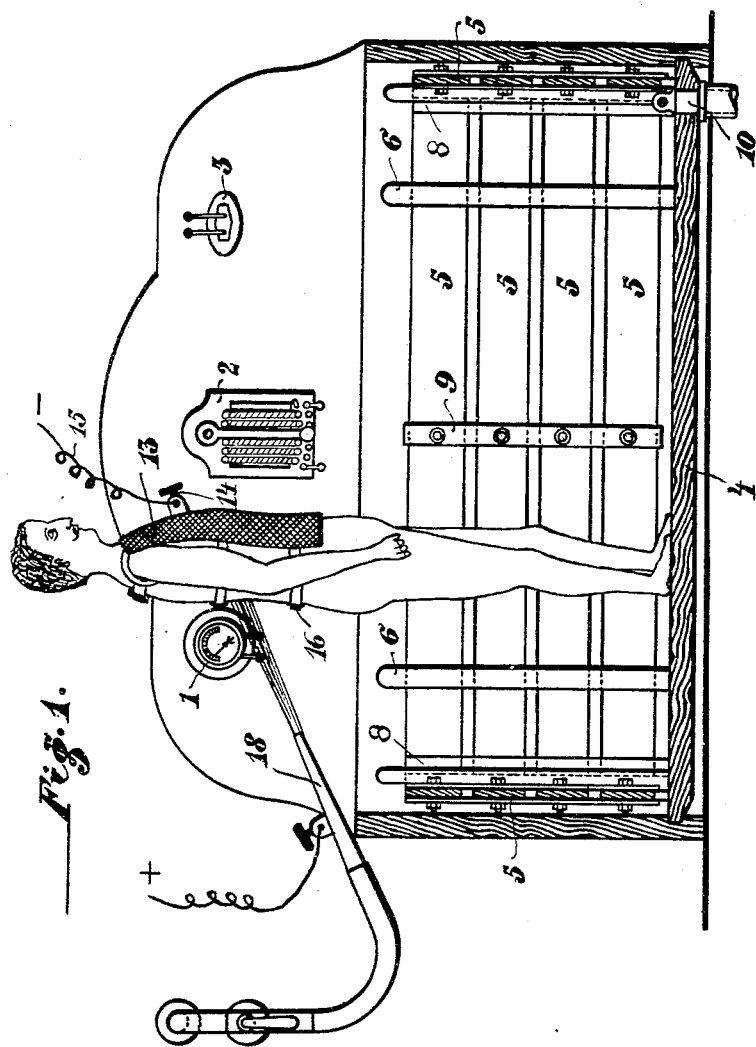

No. 653,708. Patented July 17, 1900.
J. J. STANGER.
HYDRO-ELECTROTHERAPEUTIC APPARATUS.
(Application filed Apr. 29, 1899.)

(No Model.) 7 Sheets—Sheet 2.

WITNESSES: INVENTOR
Ella L. Giles Johann Jakob Stanger
BY
Richard R.
ATTORNEYS.

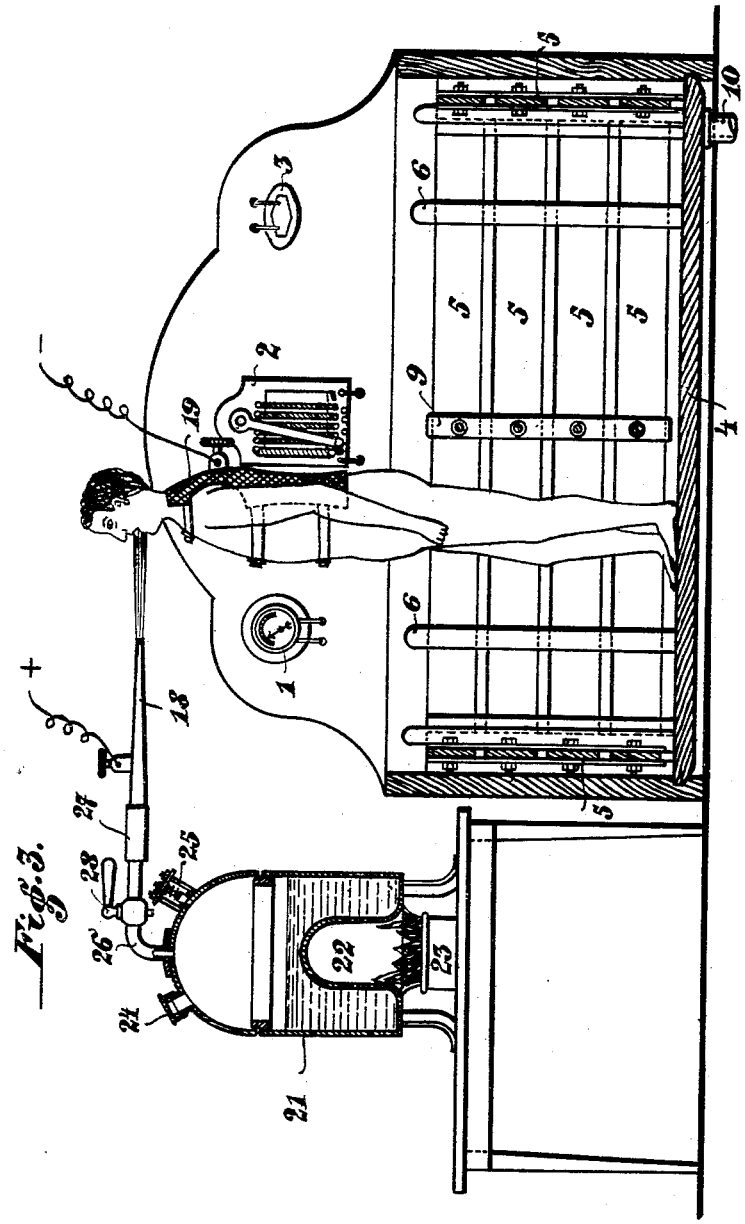

No. 653,708. Patented July 17, 1900.
J. J. STANGER.
HYDRO-ELECTROTHERAPEUTIC APPARATUS.
(Application filed Apr. 29, 1899.)
(No Model.) 7 Sheets—Sheet 4.
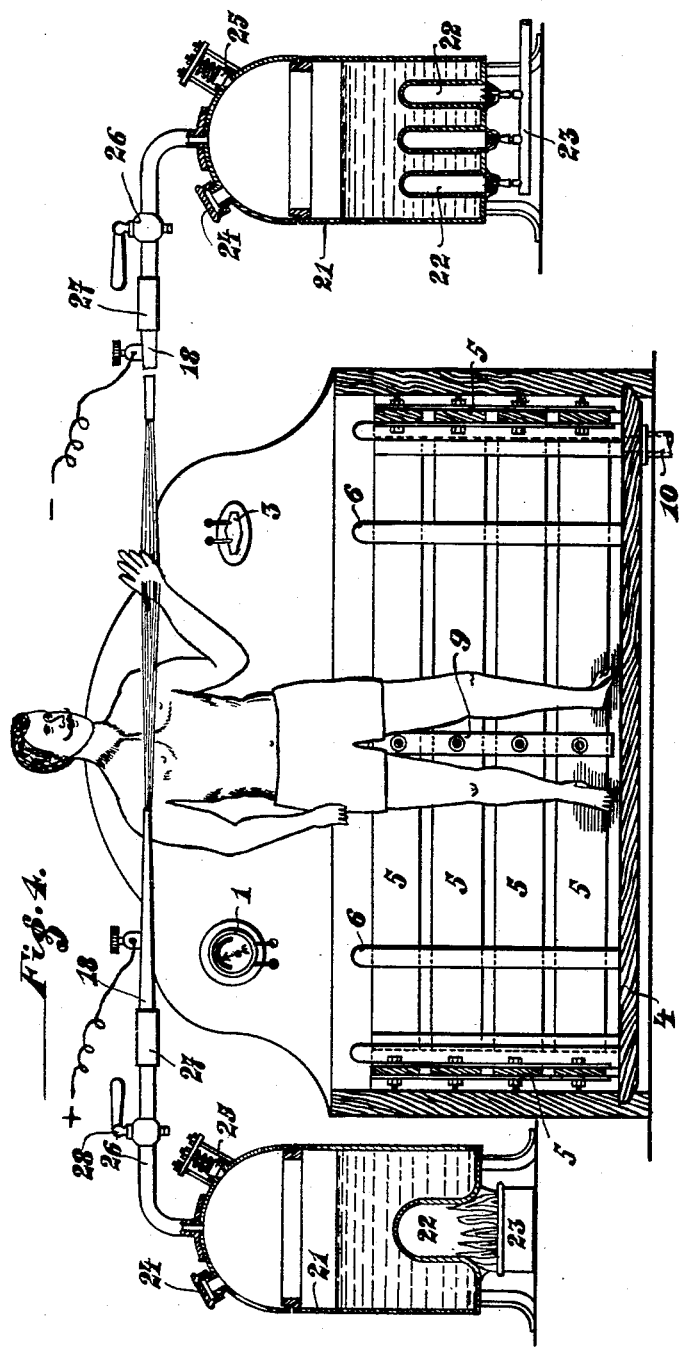
WITNESSES:
INVENTOR
Johann Jakob Stanger
BY
ATTORNEYS.

No. 653,708. Patented July 17, 1900.
J. J. STANGER.
HYDRO-ELECTROTHERAPEUTIC APPARATUS.
(Application filed Apr. 29, 1899.)
(No Model.) 7 Sheets—Sheet 5.
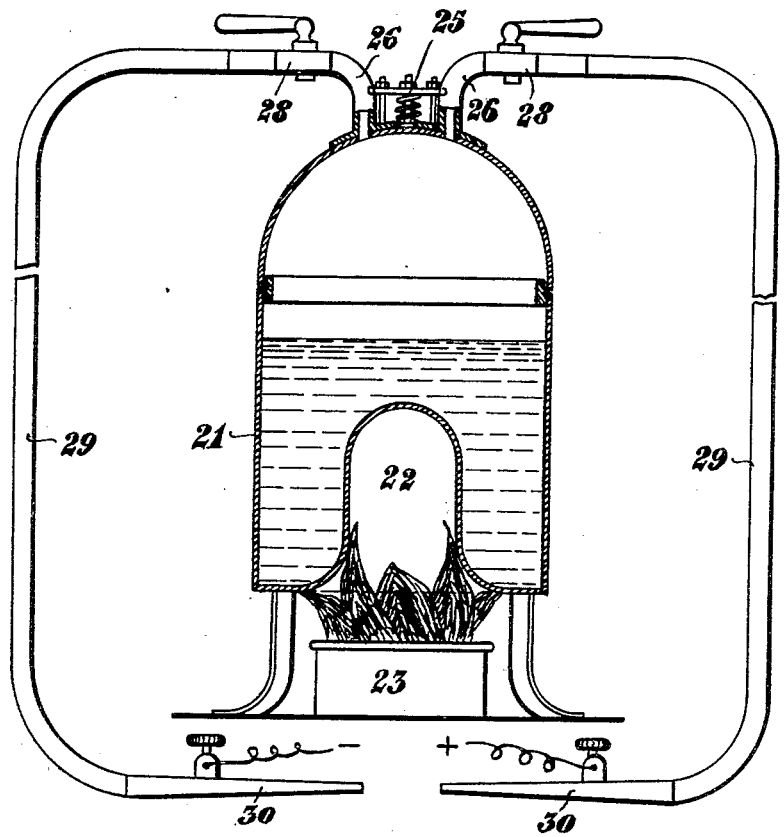
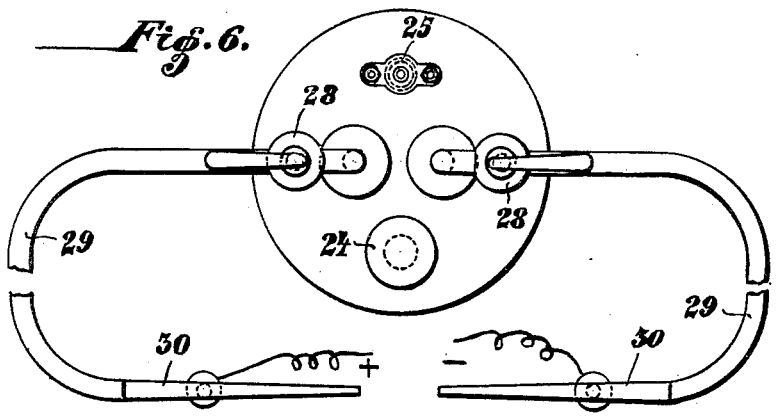
WITNESSES:
INVENTOR
Johann Jakob Stanger
BY
ATTORNEYS

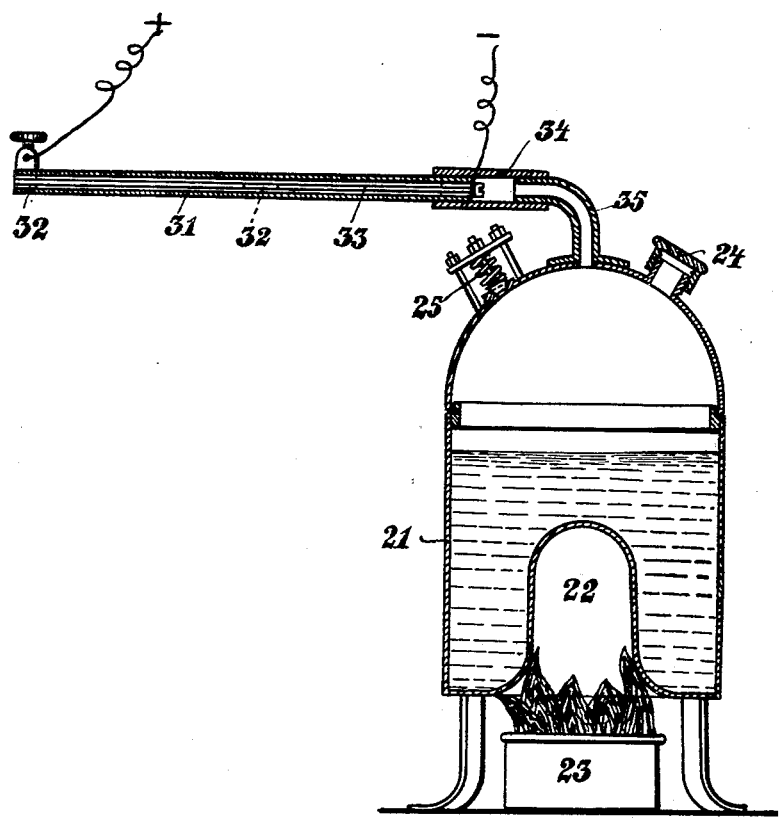

No. 653,708. Patented July 17, 1900.
J. J. STANGER.
HYDRO-ELECTROTHERAPEUTIC APPARATUS.
(Application filed Apr. 29, 1899.)
(No Model.) 7 Sheets—Sheet 7.
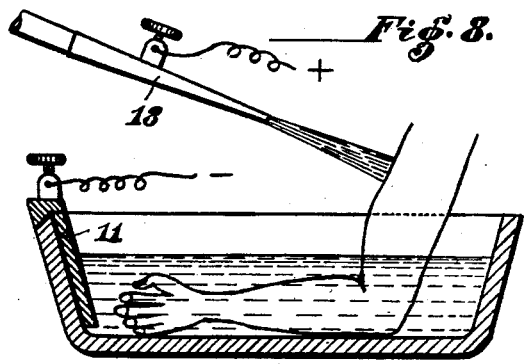
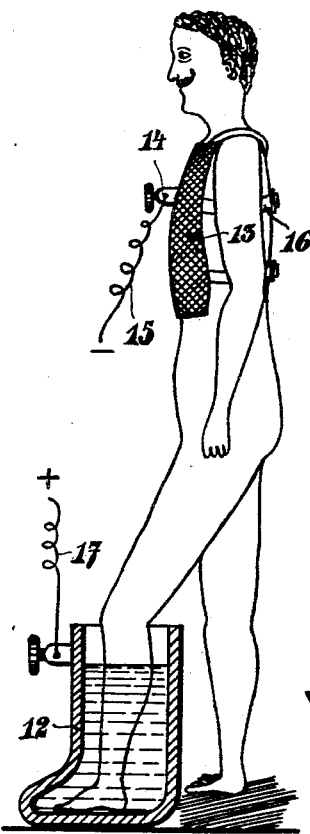
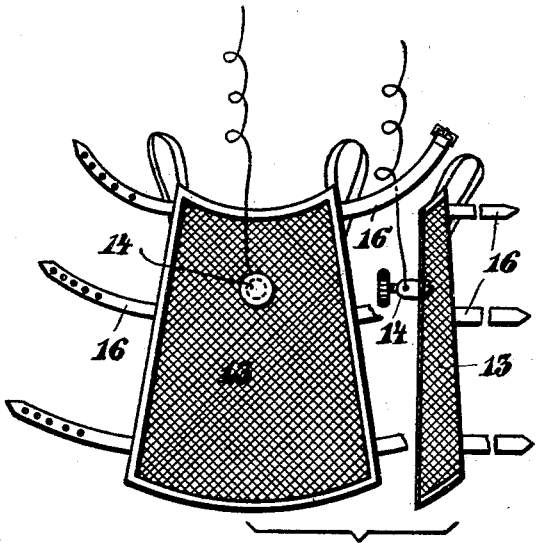
WITNESSES:
INVENTOR
Johann Jakob Stanger
BY
Richardson
ATTORNEYS.

UNITED STATES PATENT OFFICE.

JOHANN JAKOB STANGER, OF ULM, GERMANY.

HYDRO-ELECTROTHERAPEUTIC APPARATUS.

SPECIFICATION forming part of Letters Patent No. 653,708, dated July 17, 1900.

Application filed April 29, 1899. Serial No. 715,004. (No model.)

*To all whom it may concern:*

Be it known that I, JOHANN JAKOB STANGER, a subject of the King of Würtemberg, residing at Ulm, Kingdom of Würtemberg, Germany, have invented a certain new and useful Hydro-Electrotherapeutic Apparatus, of which the following is a full, clear, and exact description.

In the present apparatus for hydro-electric therapeutic purposes a medical treatment of the human body is obtained by bringing the whole body or a limb thereof into contact with an electrically-charged fluid in either the liquid or vapor state. The fluid may be a suitable chemical solution—for instance, tannin solution—and this apparatus is distinguished from the tannin-solution baths hitherto used for medical purposes by the application of electricity in connection with the fluid and its chemical composition.

This electrical apparatus has increased efficiency over those hitherto used for medical purposes the action of which depends on the application of fluid as a conductor of electricity, while over the hitherto used electrical baths the distinguishing advantage is that of being able to apply the electric current over the whole or any desired portion of the body.

In the accompanying drawings such an apparatus is illustrated with different modifications of construction in Figures 1 to 10.

The constructional modification illustrated in Figs. 1, 2, 3, and 4 forms a bath in which the whole body can be exposed to the medical effect of a bath charged with electricity—for instance, an electrical solution of tannin-bath—and the strength or pressure of the current can be regulated by means of a meter or switch placed on the bath, (voltmeter 1, resistance-regulator 2, and switch 3.) The bath 4, provided with a waste-plug 10, consists of material, such as wood, which is a non-conductor of electricity and withstands the influence of the bathing fluid mixture and is of a square shape in order to make the electrical currents passing from the carbon electrodes 5, arranged sidewise along the walls of the bath and which are placed at fixed distances from one side to the opposite one, effective over the entire bath. Carbon electrodes are preferred, because carbon is not affected by the bathing fluid—such as tannin solution and the like—like metal electrodes. These electrodes are combined in a frame by four wooden bars 6, which rest in wooden corner-supports 8. The electrodes are connected with the conducting-wires by means of metal connecting pieces or terminals 9, which in order to protect them from the action of the bathing fluid are covered with a suitable insulating covering, such as enamel. As may be seen from the drawings, longitudinal transverse electrodes are arranged in this construction. It is, however, obvious that either the longitudinal or transverse electrodes would suffice alone. In both cases the electric current can be applied to the whole body.

Figure 2:
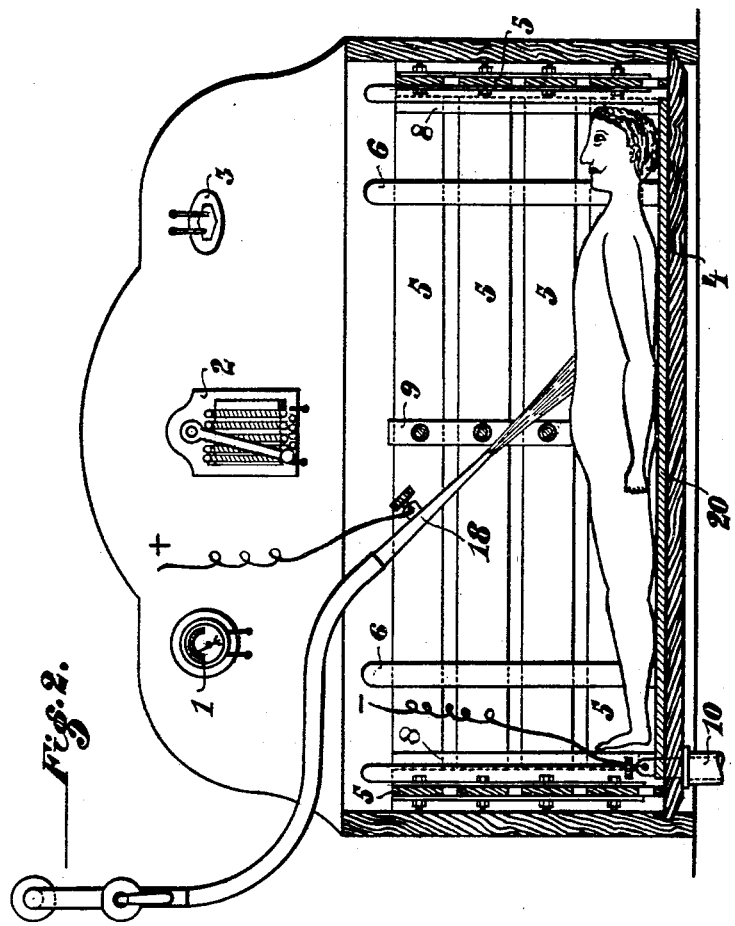

In Figs. 1 to 4 the whole body can be exposed for bathing while the bather lies in the bath, the electric current being conducted to the carbon electrodes by means of the contact-strips 9. If, however, it is only wished to treat one portion of the body—as, for example, the back, Fig. 1—then the current from the carbon electrodes can be cut off and a pipe or rose 18 be used as positive pole, to which the electrically-charged fluid is conducted in a suitable manner. The electric current passes from the pipe or rose 18 as one electrode by means of the stream of fluid and the human body to the breastplate 13 as second electrode. The mask or breastplate 13, which Fig. 10 shows clearly on a larger scale, consists of a wire-gauze 13, having a screw 14 for fixing the conducting-wire 15, and also bands or straps 16 for fastening the mask to the body. Fig. 2 shows a similar construction, only instead of the mask an electrode-plate 20 is applied on which the bather lies. The electric current in this case passes from the pipe or rose 18 through the stream of fluid and the human body to the electrode-plate 20, to which the second conducting-wire is joined. In this arrangement the patient can also naturally stand on the plate instead of lying, and the electrically-charged fluid is applied to him in the same way by means of the rose 18. Fig. 3 shows how the arrangement described can also be used for inhaling when the electrically-charged stream is simply conducted into the mouth of the patient. In this case the stream is naturally in the form of steam, as it is used for inhaling, and therefore a steaming apparatus is connected with this constructional form, which consists of the container 21 for the reception of the fluid. The container has a grate-box 22 for the fuel 23 and is fitted with closing-apertures 24 for pouring in the liquid as well as a safety-valve 25 and cock 26. The pipe 18, forming the one electrode, is connected with the steamer by the tube 27 or any other insulated inserted piece.

Similar steamers are shown in the construction Fig. 4 These stand in such a position opposite each other that their respective streams of steam meet each other, and a limb—for instance, a hand—held in the steam consequently forms a connecting-limb as electrode for the electric current passing through the pipes 18 18 of the steamer by means of the stream. The feet of the patient can naturally also be exposed to the electrical bath at the same time, as shown in the constructional form illustrated in Fig. 3.

Instead of employing two steaming apparatuses, two electrically-charged streams of a fluid and going in opposite directions can be produced with only one steamer if the latter is arranged as illustrated in Figs. 5 and 6, of which Fig. 5 shows a perpendicular section and Fig. 6 a view of the exterior. The steamer is provided for the purpose with two stop-cocks 28, to which tubes 29 are joined, which end in the pipes 33, forming perfect electrodes. The method of using these pipes is the same as in the previous example of the construction.

The form of construction illustrated in Fig. 7 shows a steaming apparatus according to Fig. 3. The pipe through which the steam flows out of the steamer forms in this case at the same time both the electrodes and is composed of an insulated rod 33 as the second electrode, forming the axis of the tube 31, and from this through suitable bridges 32 the whole is insulated and connected by means of the rubber tube 34 or the like with the pipe 35 of the steamer. If the patient lays hold of the tube 31 with the hand and allows steam to stream on him through the tube, then an electrical action takes place on his body from the tube over the body as the one electrode and the steam to the rod 33 as the second electrode.

The two apparatuses in Figs. 1 to 7 have the very serviceable and conspicuous advantage of allowing by its means the electrically-charged fluid to act on each desired portion of the body after the other successively, which is a great advantage for chronic invalids. Thus, for example, the fluid is able to operate from the hands to the feet, from the head to the feet, from the head or the mouth to the hands, &c. In electrical baths hitherto used this was not possible apart from the fact that steam-currents were not employed.

These constructions, as far as they operate with cold liquid, may be employed with great advantage on the Kneipp system. Then it is obvious that if the rose going through the latter is charged with electricity a more greatly-increased action is obtained than has hitherto been the case in all shower-baths, douches, and the like working without electricity up to now.

Fig. 8 shows a small vessel, which is principally intended for an arm-bath and is provided with a plate 11, forming the one electrode, while the other electrode is formed by the pipe 18, through which the electrically-charged fluid is conveyed. A similar arrangement is shown in Fig. 9, which may be used for a foot-bath and consists of a vessel 12. This latter may be constructed of metal, and consequently at the same time fills the place of the one electrode, while the other can be formed by the mask 13. The current passes from the conducting-wire 17 through the fluid present in the vessel 12 over the body and from the latter through the mask 13 to the conducting-wire 15.

It is obvious that in case of need precautions can be taken in order to concentrate the electrically-charged fluid as much as possible.

What I claim, and desire to secure by Letters Patent, is—

1. In an electrotherapeutical device for curative purposes, an evaporating apparatus provided with roses adapted to serve as electrodes, and two tubes connecting the roses with the apparatus whereby the steam-jets pouring out transfer electricity to the human body and that the body forms a conductor in the steam, substantially as described.

2. In an electrotherapeutical device for curative purposes, an evaporating apparatus, a nozzle therefor forming a cylindrical electrode 31, a rod 33 therein forming a second electrode whereby the rose, which exhausts steam transfers electricity to the human body, while the body forms a conducting-link in the steam-jet.

In witness whereof I have hereunto set my hand in presence of two witnesses.

JOHANN JAKOB STANGER.

Witnesses:
 KARL BOSCH,
 N. WAGNER.